United States Patent [19]
Tabata et al.

[11] Patent Number: 5,676,617
[45] Date of Patent: Oct. 14, 1997

[54] AUTOMATIC TRANSMISSION FOR VEHICLES

[75] Inventors: Atsushi Tabata, Okazaki; Kagenori Fukumura, Toyota; Yasuo Hojo, Nagoya; Takashi Shimizu, Toyota; Satoru Kasuya, Hekinan, all of Japan

[73] Assignees: Toyota Jidosha Kabushiki Kaisha, Toyota; Aisin AW Co., Ltd., Anjo, both of Japan

[21] Appl. No.: 663,666

[22] Filed: Jun. 14, 1996

[30] Foreign Application Priority Data

Jul. 12, 1995 [JP] Japan .................. 7-199061

[51] Int. Cl.$^6$ .................. F16H 3/62; F16H 3/66
[52] U.S. Cl. .................. 475/288; 475/330
[58] Field of Search .................. 475/288, 330

[56] References Cited

U.S. PATENT DOCUMENTS 5,098,357  3/1992  Asada et al. .................. 475/288
5,254,053  10/1993  Taniguchi et al. .
5,478,291  12/1995  Morisawa et al. .

*Primary Examiner*—Dirk Wright
*Attorney, Agent, or Firm*—Oblon, Spivak, McClelland, Maier & Neustadt, P.C.

[57] ABSTRACT

An automatic transmission for a vehicle, as provided a plurality of planetary gear units in which the ratios of the tooth numbers of the sun gears to the tooth numbers of the ring gears are different from each other. In the two sets of planetary gear units in which the ratios of the tooth numbers of the sun gears to the tooth numbers of the ring gears are different from each other, the ring gears are identical to each other in the tooth number, the normal module, the normal pressure angle, the angle of torsion, the pitch radius, the base radius, the bottom diameter, the top diameter, the tooth height, the dedendum, the addendum, the lead, the coefficient of normal shift and the arcuate tooth thickness, and the pinions of those two sets of planetary gear units are identical to each other in at least the arcuate tooth thickness, the coefficient of normal shift, the dedendum, the addendum, the tooth height, the angle of torsion, the normal pressure angle and the normal module.

8 Claims, 4 Drawing Sheets

FIG. 2

| TEETH | FRONT PLANETARY GEAR | | |
|---|---|---|---|
| | SUN GEAR | PINION GEAR | RING GEAR |
| NO. OF TEETH | 42 | 16 | ◎74 |
| SHAFT DISTANCE (mm) | 35.49 | | |
| NORMAL MODULE | ◎1.15 | | |
| NORMAL PRESSURE ANGLE (deg.) | ◎20 | | |
| ANGLE OF TORSION (deg.) | ◎20 | | |
| PITCH CIRCLE (mm) | 51.39979 | 19.58087 | ◎90.56153 |
| BASE CIRCLE (mm) | 47.93005 | 18.25907 | ◎84.44819 |
| LARGER DIAMETER (mm) | 52.80 | 22.65 | ◎89.5000 |
| SMALLER DIAMETER (mm) | 47.507 | 17.348 | ◎94.5000 |
| TOOTH HEIGHT (mm) | 2.646 | ◎2.651 | ◎2.500 |
| ADDENDUM (mm) | 0.700 | ◎1.535 | ◎0.531 |
| DEDENDUM (mm) | 1.946 | ◎1.117 | ◎1.969 |
| LEAD | 443.655 | 169.011 | ◎781.678 |
| | | | |
| FRONT BACKLASH (mm) | △0.09963 | △0.09963 | |
| TOP GAP (mm) | 0.416075 | 0.411350 | 0.43500 | 0.586075 |
| COEFFICIENT OF NORMAL SHIFT | −0.46212 | ◎0.35 | ◎0.46155 |
| ARCUATE TOOTH THICKNESS (mm) | 1.420 | ◎2.099 | ◎1.420 |
| | | | |
| | | | |

FIG. 3

| TEETH | MIDDLE PLANETARY GEAR | | |
|---|---|---|---|
| | SUN GEAR | PINION GEAR | RING GEAR |
| NO. OF TEETH | 32 | 21 | ◎74 |
| SHAFT DISTANCE (mm) | 32.43 | | |
| NORMAL MODULE | ◎1.15 | | |
| NORMAL PRESSURE ANGLE (deg.) | ◎20 | | |
| ANGLE OF TORSION (deg.) | ◎20 | | |
| PITCH CIRCLE (mm) | 39.16174 | 25.69989 | ◎90.56153 |
| BASE CIRCLE (mm) | 36.51814 | 23.96503 | ◎84.44819 |
| LARGER DIAMETER (mm) | 40.55 | 28.75 | ◎89.50 |
| SMALLER DIAMETER (mm) | 35.250 | 23.459 | ◎94.5 |
| TOOTH HEIGHT (mm) | 2.646 | ◎2.651 | ◎2.500 |
| ADDENDUM (mm) | 0.700 | ◎1.535 | ◎0.531 |
| DEDENDUM (mm) | 1.946 | ◎1.117 | ◎1.969 |
| LEAD | 338.023 | 222.827 | ◎781.678 |
| | | | |
| FRONT BACKLASH (mm) | △0.1000 | | △0.100 |
| TOP GAP (mm) | 0.425545 | 0.429895 | 0.44500 | 0.590545 |
| COEFFICIENT OF NORMAL SHIFT | -0.46297 | ◎0.3500 | ◎0.46155 |
| ARCUATE TOOTH THICKNESS (mm) | 1.419 | ◎2.099 | ◎1.4200 |
| | | | |
| | | | |

|     | Co | C1 | C2 | Bo | B1 | B2 | B3 | B4 | Fo | F1 | F2 |
|-----|----|----|----|----|----|----|----|----|----|----|----|
| N   | O  |    |    |    |    |    |    |    |    |    |    |
| Rev |    |    | O  | O  |    |    |    | O  |    |    |    |
| 1st | O  | O  |    |    |    |    |    | ●  | O  |    | O  |
| 2nd | ●  | O  |    |    |    |    | O  |    | O  |    |    |
| 3rd | O  | O  |    |    | ●  | O  |    |    | O  | O  |    |
| 4th | O  | O  | O  |    |    |    |    |    | O  |    |    |
| 5th |    | O  | O  | O  |    |    |    |    |    |    |    |

AUTOMATIC TRANSMISSION FOR VEHICLES

BACKGROUND OF THE INVENTION

1. Field of the Invention

The present invention relates to an automatic transmission for a vehicle and, more particularly, to a vehicular automatic transmission equipped with a gear train which is constructed mainly of a plurality of planetary gear units.

2. Related Art

This kind of automatic transmission is exemplified by an automatic transmission capable of setting five forward and one reverse gear stages, as disclosed in JPA-5-126217. The gear train of this automatic transmission is shown in a skeleton diagram of FIG. 4, and the states of applying/ releasing the frictional engagement means for setting the individual gear stages are tabulated in FIG. 5.

Specifically, the automatic transmission, as disclosed in that Publication, is constructed to include a torque converter 1, an auxiliary speed change unit 2 and a main speed change unit 3. The torque converter 1 is equipped with a lockup clutch 4, which is interposed between a front cover 6 integrated with a pump impeller 5 and a member (or hub) 8 integrated with a turbine runner 7. A (not-shown) crankshaft of an (not-shown) engine is connected to the front cover 6, and an input shaft 9, to which is connected the turbine runner 7, is connected to the carrier 11 of an overdrive planetary gear unit 10 constructing the auxiliary speed change unit 2.

Between the carrier 11 and the sun gear 12 of this planetary gear unit 10, there are interposed a multi-disc clutch C0 and a one-way clutch F0. Incidentally, this one-way clutch F0 is applied when the sun gear 12 rotates forward (in a direction of rotation of the input shaft 9) relative to the carrier 11. There is further provided a multi-disc brake B0 for stopping the rotation of the sun gear 12 selectively. A ring gear 13 or the output element of the auxiliary speed change unit 2 is connected to an intermediate shaft or the input element of the main speed change unit 3.

As a result, with the multi-disc clutch C0 or the one-way clutch F0 being applied, the planetary gear unit 10 rotates in its entirety so that the intermediate shaft 14 rotates at the same RPM as that of the input shaft 9, thus establishing a low-speed stage in the auxiliary speed change unit 2. With the brake B0 being applied to stop the rotation of the sun gear 12, the ring gear 13 is accelerated forward with respect to the input shaft 9 so that a high-speed stage is established.

On the other hand, the main speed change unit 3 is equipped with three sets of planetary gear units 15, 16 and 17, the rotary components of which are connected in the following manners. Specifically, the sun gear 18 of the first planetary gear unit 15 and the sun gear 19 of the second planetary gear unit 16 are connected to each other. The ring gear 20 of the first planetary gear unit 15, the carrier 21 of the second planetary gear unit 16 and the carrier 22 of the third planetary gear unit 17 are connected to one another, and an output shaft 23 is connected to that carrier 22. In addition, the ring gear 24 of the second planetary gear unit 16 is connected to the sun gear 25 of the third planetary gear unit 17.

The gear train of this main speed change unit 3 can set a reverse gear stage and four forward gear stages. For this setting, the main speed change unit 3 is equipped with the following clutches and brakes. Of these, the clutches will be described at first. A first clutch C1 is interposed between the ring gear 24 of the second planetary gear unit 16 and the sun gear 25 of the third planetary gear unit 17, as connected to each other, and the intermediate shaft 14. A second clutch C2 is interposed between the sun gear 18 of the first planetary gear unit 15 and the sun gear 19 of the second planetary gear unit 16, as connected to each other, and the intermediate shaft 14.

Here will be described the brakes. A first brake B1 is a band brake and is arranged to stop the rotations of the sun gears 18 and 19 of the first planetary gear unit 15 and the second planetary gear unit 16. A first one-way clutch F1 and a second brake B2 or a multi-disc brake are arrayed in series between those sun gears 18 and 19 (or a common sun gear shaft) and a casing 26. The first one-way clutch F1 is applied when the sun gears 18 and 19 are to rotate backward (i.e., in an opposite direction to that of the input shaft 9).

A third brake B3 which is a multi-disc brake is interposed between the carrier 27 of the first planetary gear unit 15 and the casing 26. Moreover, a fourth brake B4 which is a multi-disc brake for stopping the rotation of the ring gear 28 of the third planetary gear unit 17 and a second one-way clutch F2 are arranged in parallel with each other with respect to the casing 26. Incidentally, the second one-way clutch F2 is applied when the ring gear 28 is to rotate backward.

In the automatic transmission thus constructed, the five forward and one reverse gear stages can be set by applying/ releasing the individual clutches and brakes in accordance with the operation chart, as shown in FIG. 5. Incidentally: symbols ○ appearing in FIG. 5 indicate the applied states; symbols ● indicate the applied states to be taken at the engine braking states; and blanks indicate the released states.

Since the aforementioned automatic transmission employs the four sets of planetary gear units as a whole, the individual forward gear ratios and their gaps (or percentages) at the forward stages can be set to practically satisfactory values. This is because the gear ratios (i.e., the ratios of the numbers of teeth of the sun gears to the numbers of teeth of the ring gears) of the individual planetary gear units are different from one another within the practical ranges. Thus, the individual planetary gear units are composed of different parts so that the prior art has to use many kinds of planetary gear units.

On the other hand, these planetary gear units have to be customized for the automatic transmission into which they are assembled, so that their cutting tools to be used are often specially prepared. In the case of many kinds of planetary gear units, as above, there arises a problem that the cost necessary for the production facilities including that for the gear cutting tools rises.

Since especially the ring gears of the planetary gear units are broached, the cost for the facilities is raised for the increased kinds of the planetary gear units. If, therefore, the ring gear of the first planetary gear unit and the ring gear of the second planetary gear unit were identical in their tooth specifications such as the tooth number or the module, the kinds of broaches for broaching the ring gears could be reduced to lower the investment for the facilities.

If, moreover, the specifications such as the tooth number, the module or the pressure angle of the ring gears are made identical for the optimum gear ratio so that the individual gear ratios may not fluctuate, it is necessary to change the shape of the sun gear in any planetary gear unit. If the ring gear of the first planetary gear unit is diametrically enlarged to have the same diameter as that of the ring gear of the second planetary gear unit, for example, the diameter of its sun gear has also to be enlarged for maintaining that gear ratio. For assembling the automatic transmission, on the other hand, the individual parts are sequentially fitted in the inside of the casing from one side of the axial direction. In order to maintain the assembling procedure, therefore, the portion, as adjacent to the sun gear in the axial direction, has also to be diametrically enlarged in accordance with the increase in the diameter of the sun gear.

Thus, if gears of any kind in the planetary gear units having different gear ratios are to be shared without any change in the gear ratio, there arises a problem that a serious fluctuation such as the diametrical enlargement of the components occurs in the entire structure.

SUMMARY OF THE INVENTION

The present invention has been conceived on the basis of the aforementioned background and has an object to lower the cost for manufacturing an automatic transmission by sharing the components between planetary gear units.

Another object of the present invention is to improve the assemblability and mountability of a vehicular automatic transmission.

According to one aspect of the present invention, there is provided a vehicular automatic transmission which comprises a plurality of planetary gear units, each of which includes, as rotary elements: a sun gear having external teeth: a ring gear having internal teeth and arranged concentrically with the sun gear; and a carrier rotatably holding a pinion arranged between the sun gear and the ring gear, for setting a plurality of gear stages. The automatic transmission comprises at least two sets of planetary gear units, in which the ratios of the tooth numbers of the sun gears to the tooth numbers of the ring gears are different from each other. The ring gears of these planetary gear units are identical to each other in the tooth number, the normal module, the normal pressure angle, the angle of torsion, the pitch radius, the base radius, the bottom diameter, the top diameter, the tooth height, the dedendum, the addendum, the lead, the coefficient of normal shift and the arcuate tooth thickness, and the pinions of the two sets of planetary gear units are identical to each other in at least the arcuate tooth thickness, the coefficient of normal shift, the dedendum, the addendum, the tooth height, the angle of torsion, the normal pressure angle and the normal module.

In this vehicular automatic transmission, therefore, the power transmission path is set through the plurality of planetary gear units in which the gear ratios, i.e., the ratios of the tooth numbers of the sun gears to the tooth numbers of the ring gears are different from each other, so that the gear ratio to be established accords to the gear ratios of the planetary gear units in dependence upon the manner how to set the transmission path. Any to sets of those planetary gear units are different in the gear ratio from each other but identical to each other in the specifications of the tooth structures of the ring gears such as the tooth number, the normal module, the normal pressure angle, the angle of torsion, the pitch radius, the base radius, the bottom diameter, the top diameter, the tooth height, the dedendum, the addendum, the lead, the coefficient of normal shift and the arcuate tooth thickness, and the pinions of the individual planetary gear units are identical to each other in at least the arcuate tooth thickness, the coefficient of normal shift, the dedendum, the addendum, the tooth height, the angle of torsion, the normal pressure angle and the normal module. As a result, the broaches for cutting those ring gears can be commonly shared to simplify the manufacture facilities thereby to lower the manufacture cost.

Moreover, the structures of the ring gears are shared between the two sets of planetary gear units so that the front backlashes of these planetary gear units are different from each other.

Still moreover, the aforementioned two sets of planetary gear units can be arranged adjacent to each other on a common axis. In this case, the sun gears of the planetary gear units are formed integrally with the outer circumference of a sun gear shaft.

A fitting stem to be formed in the sun gear shaft extends to that of the aforementioned two sets of planetary gear units, the pinion of which has the smaller tooth number, and has a smaller diameter than the bottom diameter of the sun gear of the same planetary gear unit. As a result, it is possible to assemble the pinions and so on over the outer circumference of the fitting stem.

According to another aspect of the present invention, there is provided a vehicular automatic transmission which comprises a plurality of sets of planetary gear units, each of which includes, as rotary elements: a sun gear having external teeth: a ring gear having internal teeth and arranged concentrically with the sun gear; and a carrier rotatably holding a pinion arranged between the sun gear and the ring gear, for setting a plurality of gear stages. The automatic transmission comprises: two sets of planetary gear units made different from each other in the tooth numbers of their pinions and identical to each other in the pitch diameters of their ring gears and arranged adjacent to each other on a common axis; and a fitting stem integrated with the sun gear of that of the two sets of planetary gear units, the pinion of which has the smaller tooth number, and extending away from the other of planetary gear units such that its extension has an external diameter no more than the bottom diameter of the sun gear.

According to this construction, the pinions can be brought over the outer circumference of the fitting stem into meshing engagement with the sun gears, to improve the assemblability of the planetary gear units.

The above and further objects and novel features of the present invention will more fully appear from the following detailed description when the same is read with reference to the accompanying drawings. It is to be expressly understood, however, that the drawings are for purpose of illustration only and are not intended as a definition of the limits of the invention.

BRIEF DESCRIPTION OF THE DRAWINGS

FIG. 2 is a diagram enumerating one example of the specifications of a front planetary gear unit;

FIG. 3 is a diagram enumerating one example of the specifications of a middle planetary gear unit;

DETAILED DESCRIPTION OF THE PREFERRED EMBODIMENT

Figure 1:
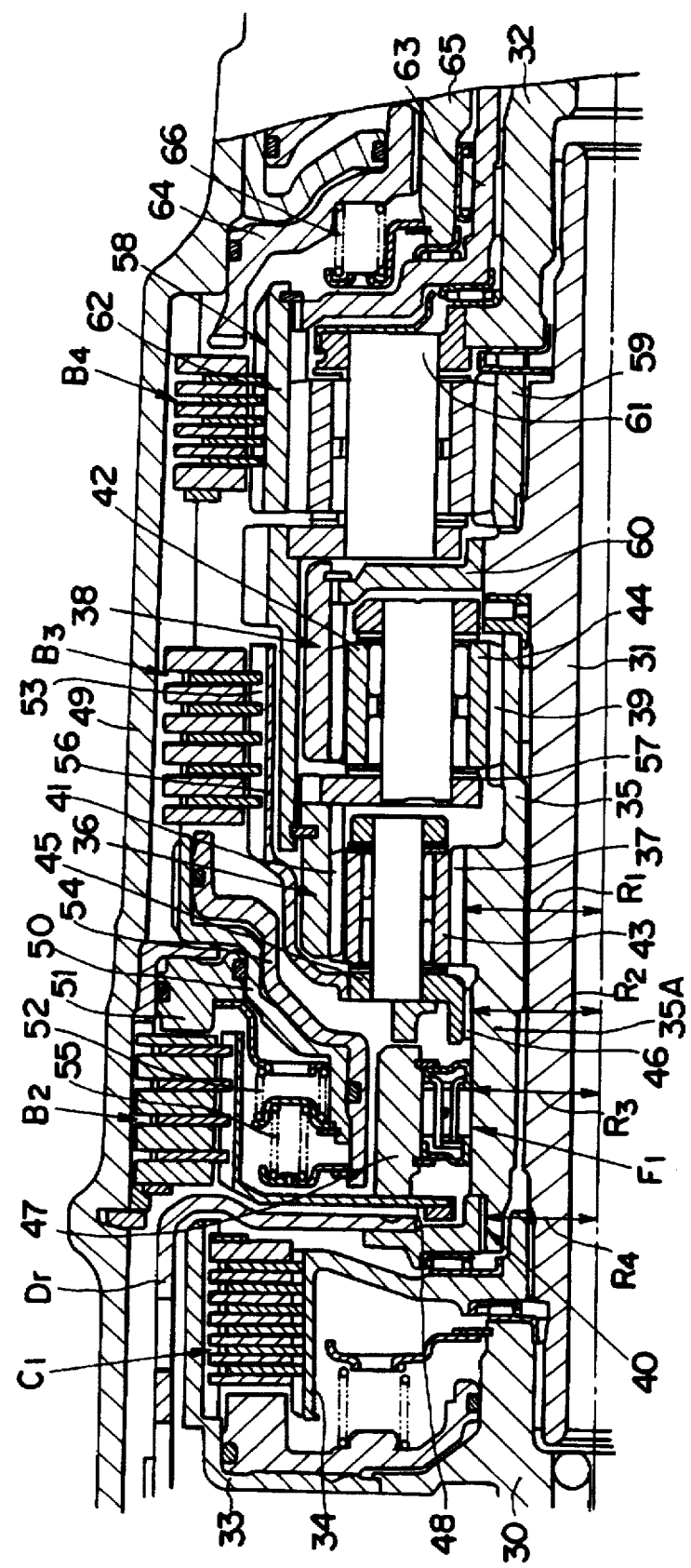
FIG. 1 is a section showing a portion of one embodiment of the present invention.
Figures 4, 5:
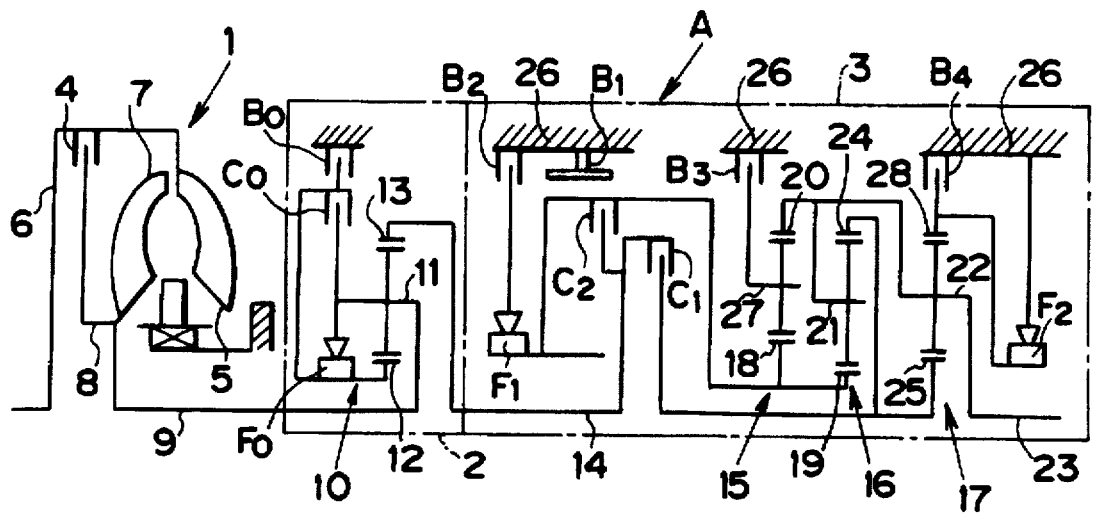
FIG. 4 is a skeleton diagram showing a gear train in an automatic transmission of the prior art, to which the present invention can be applied.
FIG. 5 is a clutch/brake application chart exemplifying the operations of the gear train.

The present invention will be described more specifically with reference to the accompanying drawings. Incidentally, the embodiment to be described is directed to the case in which the present invention is applied to an automatic transmission provided with the gear train, as shown in the skeleton diagram of FIG. 4. A major portion of the main speed change unit of the automatic transmission is shown in the section of FIG. 1.

At the leading end of an intermediate shaft 30 for transmitting the power from the auxiliary speed change unit, there is rotatably on a common axis a second intermediate shaft 31, at the leading end of which is rotatably arranged an output shaft 32. With the outer circumference of the leading end of that intermediate shaft 30, there is integrally mounted a clutch drum 33 of the first clutch C1, as protruded radially outwards. A clutch hub 34, as arranged radially internally of the clutch drum 33, is splined to the outer circumference of the one end of the second intermediate shaft 31.

Around the second intermediate shaft 31, there is rotatably fitted a sun gear shaft 35 or a hollow shaft. This sun gear shaft 35 is provided on its outer circumference with the sun gear 37 of a front planetary gear unit 36 and the sun gear 39 of a middle planetary gear unit 38. The sun gear shaft 35 has a portion which extends from its portion of the sun gear 37 of the front planetary gear unit 36 away from (or leftward of FIG. 1) the sun gear 39 of the middle planetary gear unit 38 so far that its leading end comes close to the clutch hub 34. In the outer circumference of the leading end of the sun gear shaft 35, there is formed a spline portion 40, to which is so splined the end of the clutch drum Dr of the second clutch C2 surrounding the outer circumference of the first clutch C1 that the clutch drum Dr may rotate together.

Here, the ratio (of the pinion tooth number/the ring gear tooth number) of the number of teeth of the pinion to the number of teeth of the ring gear of the front planetary gear unit 36 is set at a larger value than the ratio (of the pinion tooth number/the ring gear tooth number) of the number of teeth of the pinion to the number of teeth of the ring gear of the middle planetary gear unit 38, but the ring gears 41 and 42 in these planetary gear units 36 and 38 are constructed to have the common specifications except their face widths. In other words, these ring gears 41 and 42 are given the common specifications such as the number of teeth, the module, the normal pressure angle, the pitch circle diameter, the coefficient of normal shift and the tooth thickness. As a result, the sun gear 37 of the front planetary gear unit 36 has a larger number of teeth than that of the sun gear 39 of the middle planetary gear unit 38.

In accordance with this, the number of teeth of the pinion 43 of the front planetary gear unit 36 is made smaller than that of the pinion 44 of the middle planetary gear unit 38. Of the specifications of the teeth in these pinions 43 and 44, at least the coefficients of normal shift and the tooth thicknesses are equalized to each other. Incidentally, the specifications of the front planetary gear unit 36 are enumerated in FIG. 2, whereas the specifications of the middle planetary gear unit 38 are enumerated in FIG. 3. In these FIGS. 2 and 3, symbols ⊙ indicate the commonly shared items, and symbols Δ indicate the items which are adjusted to share the specifications of the ring gears commonly.

Thus, with the front planetary gear unit 36 and the middle planetary gear unit 38 being different in their gear ratios, the specifications are made identical except the face widths of the ring gears 41 and 42, and the shift coefficients and the tooth thicknesses of the pinions 43 and 44 are made identical, so that the front backlashes are different between those planetary gear units 36 and 38. In other words, the tooth specifications of the ring gears 41 and 42 are made identical by making the front backlashes different. Incidentally, it is arbitrary to equalize the widths.

On the sun gear shaft 35 between the sun gear 37 and the spline portion 40, there are fitted a carrier cover 45 and the one-way clutch F1 of the front planetary gear unit 36. Specifically, on the portion adjacent to the sun gear 37, there is rotatably fitted through a bushing 46 the carrier cover 45 which is made integral with the carrier holding the pinion 43. Around the adjacent portion, there are fitted a number of sprags which are circumferentially arrayed and retained by the retainer, so that this portion of the sun gear shaft 35 provides the inner race of the one-way clutch F1.

Here will be described the external diameters of the sun gear shaft 35. The external diameter R2 of the portion, on which is fitted the bushing 46, or the external diameter R3 of the portion (or the fitting step portion) 35A, on which is fitted the one-way clutch F1, is made smaller than the bottom diameter (or smaller diameter) R1 of the sun gear 37, and the external diameter R4 of the spline portion 40 is made further smaller than those external diameters R2 and R3. As a result, the bushing 46 or the carrier cover 45 and the pinion 43 can be assembled as a sub-assembly with the sun gear shaft 35. After this, the one-way clutch F1 can be fitted on the sun gear shaft 35, and the clutch drum Dr can then be fitted on the spline portion 40.

With an outer race 47 of the one-way clutch F1, there is integrated a brake hub 48 of the second brake B2, the outer circumference of which confronts the inner circumference of a casing 49. Friction discs, as composing the second brake B2, are splined to both the outer circumference of the brake hub 48 and the inner circumference of the casing 49. Between this brake hub 48 and the outer race 47 of the one-way clutch F1, there is extended from the inner circumference of the casing 49 a cylindrical member 50 which is integrated with the casing 49. A piston 51 for applying the second brake B2 is so fitted around the cylindrical member 50 as to move back and forth in the axial direction. Moreover, a return spring 52 for returning the piston 51 is arranged around the leading end of the cylindrical member 50.

Around the front and middle planetary gear units 36 and 38, there is arranged a cylindrical brake hub 53 of the third brake B3, which is integrated with the carrier cover 45. To the outer circumference of the brake hub 53 and the inner circumference of the casing 49, there are individually splined the friction discs which compose the third brake B3.

A piston 54 for applying the third brake B3 is so held in the inner circumference of the cylindrical member 50 as to move back and forth in the axial direction, and a return spring 55 is arranged between the end of the cylindrical member 50 and the end portion of the piston 54. In other words, the two kinds of return springs 52 and 55 are arranged together by making use of the space around the one-way clutch F1.

In the brake hub 53 of the third brake B3, there is concentrically arranged a connecting drum 56 which is integrated with the ring gear 41 of the front planetary gear unit 36. Moreover, this connecting drum 56 is extended around the middle planetary gear unit 38 to the axial end portion of the same (as located at the righthand end of FIG. 1). Incidentally, the ring gear 41 in the front planetary gear unit 36 is integrally connected to the carrier 57 of the middle planetary gear unit 38.

The sun gear 59 of a rear planetary gear unit 58 is splined to the outer circumference of the end of the second intermediate shaft 31, as located at the side of the output shaft 32.

With the portion of the outer circumference of the second intermediate shaft 31, as located between the portion to which is splined the sun gear 59 and the middle planetary gear unit 38, there is integrated a connection plate 60 which is splined to the ring gear 42 of the middle planetary gear unit 38. The carrier 61 of the rear planetary gear unit 58 is integrally connected at one hand to the connecting drum 56 and at the other to the output shaft 32. Moreover, the flanged end of a connection shaft 63 is splined to a ring gear 62.

On the other hand, this ring gear 62 acts as the brake hub of the fourth brake B4, too. The friction discs composing the fourth brake B4 are splined to both the outer circumference of the ring gear 62 and the confronting inner circumference of the casing 49. Moreover, a piston 64 for applying the fourth brake B4 is fitted in a cylindrical support portion 65 which is protruded radially inward from the end of the casing 49. Incidentally, reference numeral 66 appearing in FIG. 1 designates a return spring.

In the automatic transmission thus far described, therefore, the ring gear 41 of the front planetary gear unit 36 and the ring gear 42 of the middle planetary gear unit 38 are given the structures, the specifications of which are made identical except the face widths of their teeth. As a result, a common broach can be used for broaching those ring gears 41 and 42. This makes it possible to reduce the cost for the manufacturing facilities including the cost for the tools for machining the aforementioned components of the automatic transmission.

In the automatic transmission, moreover, the ring gear 41 of the front planetary gear unit 36, the pinion of which has a less tooth number, is given the same tooth specifications except the face width as those of the ring gear 42 of the middle planetary gear unit 38, the pinion of which has a more tooth number, so that the diameter of the sun gear 37 of the front planetary gear unit 36 is enlarged. On the contrary, the portions, as integrated with the sun gear 37, that is, the fitting portion for fitting the bushing 46 to support the carrier cover 45, the fitting portion for arraying the sprags of the one-way clutch F1, and the spline portion 40 are made radially smaller than the bottom diameter (or smaller diameter) R1 of the sun gear 37. As a result, after the sun gear shaft 35 has been fitted around the second intermediate shaft 31, the bushing 46 can be fitted, and the pinion 43 and the carrier cover 45 can be fitted as the sub-assembly around the sun gear 37. Moreover, the one-way clutch F1 can be fitted around the sun gear shaft 35, and the clutch drum Dr can then be fitted on the spline portion 40.

In short, even if the diameter of the sun gear 37 is enlarged, the automatic transmission can be assembled by inserting the individual components sequentially from the opening (as located at the lefthand side of FIG. 1) of the casing 49 without any trouble in the assemblability. Thanks to the aforementioned construction of the front planetary gear unit 36, moreover, even if the sun gear 37 is diametrically enlarged, there are no other components to be diametrically enlarged, so that the return springs 52 and 55 can be arranged by making use of the space around the one-way clutch F1. As a result, the automatic transmission can be made compact without increasing the external diameter in its entirety.

In the automatic transmission, furthermore, thanks to the enlarged diameter of the front planetary gear unit 36, the number of pinions 43 necessary for transmitting a predetermined torque can be reduced such that the numbers of pinions of the front planetary gear unit 36 and the middle planetary gear unit 38 can be individually reduced to four, for example, in the foregoing embodiment.

Incidentally, the foregoing embodiment is exemplified by applying the present invention to the automatic transmission which is provided with the gear train, as disclosed in JPA-5-126217. Despite of this disclosure, however, the present invention should not be limited thereto but can also be applied to an automatic transmission having another gear train. In short, the present invention can be applied to the automatic transmission provided with the gear train which is constructed mainly of a plurality of planetary gear units. Therefore, the ring gears having identical tooth specifications should not be limited unlike the foregoing embodiment to the ring gear of the front planetary gear unit and the ring gear of the middle planetary gear unit.

In the foregoing embodiment, moreover, the sun gear shaft 35 and the sun gear 37 are incorporated into the unitary structure but may be integrally rotatable but separate members. In addition, the portion for fitting the bushing 46 and the portion for fitting the one-way clutch are given the same external diameter but may have different external diameters. In this modification, the farther fitting portion from the sun gear 37 may have the smaller external diameter.

Here will be summarized the advantages to be obtained by the present invention. According to the present invention, of a plurality of planetary gear units, any pair of planetary gear units are constructed such that their ring gears are made identical in at least the number of teeth, the normal module, the normal pressure angle, the angle of torsion, the pitch radius, the base diameter, the top diameter, the tooth height, the dedendum, the addendum, the lead, the coefficient of normal shift and the arcuate tooth thickness, so that the ring gears can share the tools for cutting themselves. This makes it possible to reduce the cost for the facilities including the tools and accordingly the cost for manufacturing the automatic transmission.

In these planetary gear units, moreover, the diameter of the sun gear in the planetary gear unit, the pinion of which has the smaller tooth number, is enlarged the more. Since, however, the external diameter of the adjacent fitting portion integrated with the sun gear is made no more than the bottom diameter of the sun gear, the assemblability of the pinion is not deteriorated by the enlarged diameter of the sun gear. In the automatic transmission of the present invention, therefore, the cost can be lowered without deteriorating the assemblability.

What is claimed is:

1. A vehicular automatic transmission which has a plurality of planetary gear units, each of which includes, as rotary elements: a sun gear having external teeth; a ring gear having internal teeth and arranged concentrically with said sun gear; and a carrier rotatably holding a pinion arranged between said sun gear and said ring gear, for setting a plurality of gear stages, comprising:

at least two sets of planetary gear units, in which the ratios of the tooth numbers of the sun gears to the tooth numbers of the ring gears are different from each other, wherein the ring gears of said two sets of planetary gear units are identical to each other in the tooth number, the normal module, the normal pressure angle, the angle of torsion, the pitch radius, the base radius, the bottom diameter, the top diameter, the tooth height, the dedendum, the addendum, the lead, the coefficient of normal shift and the arcuate tooth thickness, and wherein the pinions of said two sets of planetary gear units are identical to each other in at least the arcuate tooth thickness, the coefficient of normal shift, the dedendum, the addendum, the tooth height, the angle of torsion, the normal pressure angle and the normal module.

2. A vehicular automatic transmission according to claim 1,
wherein the front backlashes of said two sets of planetary gear units are different from each other.

3. A vehicular automatic transmission according to claim 1,
wherein said two sets of planetary gear units are arranged adjacent to each other on a common axis.

4. A vehicular automatic transmission according to claim 3, further comprising a sun gear shaft having the sun gears of said two sets of planetary gear units formed integrally with its outer circumference.

5. A vehicular automatic transmission according to claim 4,
wherein said sun gear shaft has a fitting stem extending to that of said two sets of planetary gear units, the pinion of which has the smaller tooth number, and having a smaller diameter than the bottom diameter of the sun gear of the same planetary gear unit.

6. A vehicular automatic transmission which has a plurality of planetary gear units, each of which includes, as rotary elements:
a sun gear having external teeth: a ring gear having internal teeth and arranged concentrically with said sun gear; and a carrier rotatably holding a pinion arranged between said sun gear and said ring gear, for setting a plurality of gear stages, comprising:
two sets of planetary gear units made different from each other in the tooth numbers of their pinions and identical to each other in the pitch diameters of their ring gears and arranged adjacent to each other on a common axis; and
a fitting stem integrated with the sun gear of that of said two sets of planetary gear units, the pinion of which has the smaller tooth number, and extending away from the other of planetary gear units such that its extension has an external diameter no more than the bottom diameter of said sun gear.

7. A vehicular automatic transmission according to claim 6, wherein a spline portion having a smaller diameter than the diameter of said fitting portion is integrated with the end of said fitting stem, as located at the side opposed to said sun gear.

8. A vehicular automatic transmission according to claim 6, further comprising a sun gear shaft having the sun gears of said two sets of planetary gear units and said fitting stem.

* * * * *